United States Patent [19]
Hottinger

[11] 4,067,236
[45] Jan. 10, 1978

[54] METHOD AND SYSTEM FOR UNAMBIGUOUS MEASUREMENT OF VOLUME FLOW

[75] Inventor: Charles F. Hottinger, Stanford, Calif.

[73] Assignee: The Board of Trustees of Leland Stanford Junior University, Stanford, Calif.

[21] Appl. No.: 630,268

[22] Filed: Nov. 10, 1975

[51] Int. Cl.$^2$ ............................................. G01F 1/66
[52] U.S. Cl. ............................. 73/194 A; 128/2.05 F
[58] Field of Search ........ 73/194, 194 A; 128/2.05 F, 128/2.05 Z

[56] References Cited

U.S. PATENT DOCUMENTS

| | | | |
|---|---|---|---|
| 3,498,290 | 3/1970 | Shaw et al ........................ | 73/194 A |
| 3,554,030 | 1/1971 | Peronneau ........................ | 73/194 A |
| 3,766,517 | 10/1973 | Fahrbach ........................ | 73/194 A |
| 3,939,707 | 2/1976 | Kossoff ........................ | 73/194 A |
| 3,977,247 | 8/1976 | Hassler ........................ | 73/194 A |

OTHER PUBLICATIONS

Arts et al., "On the Instantaneous Measurement of Bloodflow by Ultrasonic Means," Med. & Biol. Engng, Vol. 10, No. 1, pp. 23–34, 1972, copy in 73/194 A.
Gosling et al. "Transcutaneous Measurement of Arterial Blood-Velocity by Ultrasound," Ultrasonics For Industry (Oct. 1969), Conference Papers, copy in 73–194 A.

Primary Examiner—Charles A. Ruehl
Attorney, Agent or Firm—Flehr, Hohbach, Test, Albritton & Herbert

[57] ABSTRACT

An ultrasonic pulsed Doppler system and method for unambiguous measurement of fluid volume flow in a conduit. One or more transducers are used to measure the volume flow normal to an arbitrary surface cutting across the conduit lumen. A method which includes ensonifying a sample surface and obtaining signals which are processed to provide a measure of the unambiguous volume flow. Resulting estimates of volume flow through the conduit lumen are not a function of conduit orientation, shape or fluid velocity profile.

14 Claims, 9 Drawing Figures

METHOD AND SYSTEM FOR UNAMBIGUOUS MEASUREMENT OF VOLUME FLOW

BACKGROUND OF THE INVENTION

The present invention relates generally to a method and system for unambiguous measurement of fluid volume flow, more particularly to a method and apparatus suitable for measuring blood volume flow in a vessel.

The clinical importance of measuring blood volume flow through the different vessels in the body has long been recognized. This capability would allow both study of normal vacular conditions as well as the diagnosis of a variety of pathological states. Most of the various equipments proposed for this task suffer from one or more inherent drawbacks. Techniques which use the electromagnetic cuff, the ultrasonic transmit-time detector, or radioactive dye dilution measurements are inherently invasive and not suited for transcutaneous modes of use. Such non-evasive methods as plethysmography nuclear magnetic resonance detection, and electrical impedance techniques are insufficiently specific in distinguishing between flow through the internal and external carotid arteries, for instance.

During the past fifteen years the ultrasonic Doppler shift has been used for blood flow measurement. While not suffering from the inherent difficulties that plagued other methods, ultrasonic Doppler shift techniques have until now required careful measurement or estimate of parameters such as vessel orientation, size and shape as well as the shape of the velocity profile across the lumen. Without determination of these parameters, an accurate estimate of blood flow is not possible.

Specific Doppler shift techniques used in the prior art include the conventional continuous wave Doppler measurement of the volume flow. This involves generating a continuous ultrasonic beam with a first transducer. A second transducer detects the signals scattered from the particles in the sample volume. Frequency shift in the resulting Doppler spectrum is used to estimate the volume flow. Several assumptions are made, among which is that: (1) the vessel lumen is circular and of a diameter which is constant during the cardiac cycle: (2) the velocity profile is parabolic having no radial components; and (3) the orientation of the vessel axis is accurately given. Errors in any of these assumptions can lead to large variations in the measured or estimated blood flow volume.

Another technique has been the range gated pulse Doppler system typically using a single transducer as both a transmitter and receiver. Sample volumes are approximated by a number of points at various ranges along the ultrasonic beam path. The estimate of volume flow is derived from a weighted sum of the measured Doppler shift along the beam path. The assumptions regarding the lumen shape, size and orientation discussed above apply. The velocity profile, however, is derived from measuring the velocity at a plurality of points and obtaining a weighted average and in this regard, this method of measurement is more accurate.

OBJECTS AND SUMMARY OF THE INVENTION

It is a general object of the present invention to provide an improved method and system for determination of blood flow volume.

It is another object of the present invention to provide a method and system in which the measurement of blood flow is not dependent upon orientation, shape or velocity profile of the blood flowing in the vessel.

It is another object of the present invention to provide a system which is simple in construction and easy to operate.

The foregoing and other objects of the invention are achieved by a system in which an ultrasonic transducer ensonifies a thin sample volume surface in a conduit in which fluid flow is to be measured, a transducer means is positioned to receive backscattered power from particles in said sample volume surface, processing means process the output of the transducer to obtain a first signal which is proportional to the first moment of the Doppler power spectrum, means including a transducer is provided for obtaining a scaling signal from said sample surface, and means are provided for scaling the first signal with the scaling signal to generate an output signal which is proportional to the volume flow in said conduit.

The method of measuring volume flow in a conduit which comprises the steps of ensonifying a thin sample volume surface in the conduit, receiving backscattered power from said sample volume surface, processing the received back-scattered power to obtain a signal which is proportional to the first moment of the Doppler power spectrum, additionally generating a scaling signal from said sample surface and scaling said first signal with the scaling signal to provide a signal which is proportional to volume flow.

DESCRIPTION OF PREFERRED EMBODIMENTS

In order to provide a better understanding of the method and system of the present invention, a brief description of the Rayleigh scattering of ultrasound by moving particles is presented. The mechanism responsible for scattering ultrasound below 16 MHz in blood has been shown to be first order Rayleigh scattering by erythrocytes. Particle speed and direction determines the detected Doppler shift, while its size and location control the amplitude of the scattered wave. Because of these relationships, the detected Doppler power spectrum can be shown to contain the required information for flow determination.

When a particle of velocity $\bar{v}$ scatters an incident beam with a wave vector $\bar{k}_i$ and wave length $\lambda_i$, the vector of the detected scatter wave $\bar{k}_s$ is shifted in frequency by the amount $$\Delta f = \left(\frac{1}{2\pi}\right) \bar{v} \cdot (\bar{k}_s - \bar{k}_i) \quad (1)$$

$$\bar{k}_s = (2\pi/\lambda_s) \cos \theta_s \quad (2)$$

and $$\bar{k}_i = (2\pi/\lambda_s) \cos \theta_i \quad (3)$$

where $\theta_i$ is the angle of incidence of the ultrasonic beam and $\theta_s$ is the angle of the scattered ultrasonic beam.

Substituting in Equation 1

$$\Delta f = |\bar{v}| \left(\frac{\cos \theta_s}{\lambda_s} - \frac{\cos \theta_i}{\lambda_i}\right) \quad (4)$$

In the usual condition $|\bar{v}| << c$ and Equation $|4|$ becomes $$\Delta f = \frac{\bar{v}}{\lambda} (\cos \theta_s - \cos \theta_i)$$

If the sound is backscattered $$\Delta f = 2/\lambda \, |\bar{v}| \cos \theta_s \quad (5)$$

In this case, the detected Doppler shift, $\Delta f$, indicates the velocity component along the beam axis.

The relative power scattered by a particle is determined not by its velocity, but by its size, location, and the scattering angle. For a particle volume $\nu$, at distance $r$ from the detector, the scattered power per steradian is given by $$\left(\frac{I_s}{I_o}\right) = \frac{\bar{k}_i^4}{16\pi^2} \frac{\nu^2}{r^2} \left\{\left(\gamma_\kappa + \gamma_\rho \frac{\bar{k}_i \cdot \bar{k}_s}{|\bar{k}_i| |\bar{k}_s|}\right)\right\}^2 \quad (6)$$

Here $\gamma_\kappa$ and $\gamma_\rho$ are the scattering co-efficients determined by the particle compressibility and density relative to the medium.

Since the particles within a sample volume are randomly located, the average scattered power received from uniformly ensonified particles is proportional to the second moment of the particle volume distribution.

$$\left\langle \sum \left(\frac{I_s}{I_o}\right) \right\rangle_N \sim \sum_{i=1}^{N} \nu_i^2 \quad (7)$$

particles

Normally, this second moment per unit volume is considered uniform, on the average, through a fluid such as blood, so that $$\left(\frac{I_s}{I_o}\right) \sim \sum_{i=1}^{N} \nu_i^2 \sim N \quad (8)$$

In addition, particle motion is assumed to be due to convection, so that estimates of volume flow of blood can be based on measurements of particle movement.

Under these conditions, the Doppler power spectrum $S(f)$ returning from a sample volume has the property $S(f) df \sim$ number of particles causing Doppler shifts between $f$ and $f + df$ If the particles within the sample volume are uniformly ensonified, then the backscattered spectrum has as its centroid $$<f> = \frac{\int f S(f) df}{\int S(f) df} = \frac{2 < \bar{v} \cos \theta >}{\lambda} \quad (9)$$

Thus, the centroid of the backscattered Doppler power spectrum indicates the average velocity component parallel to the beam axis within the sample volume.

The Doppler shift measurements can be applied to the measurement of the volume flow by the general definition $$\dot{Q} \, [ml/sec] \triangleq \int_S \bar{v} \cdot \bar{n} \, da \quad (10)$$

where $\bar{n}$ is normal to incremental area $da$ making up the arbitrary volume surface S. Briefly stated, the unambiguous estimate of $\dot{Q}$ can be achieved by estimating the volume flow normal to an arbitrary plane of examination. This can be achieved by choosing a sample volume as mentioned above in the form of a sample volume surface cutting the flow. With incident direction normal to the surface, the Doppler power centroid indicates the average fluid velocity normal to the surface.

Equation 10 can be separated directly into the form $$\dot{Q} = \int_S \bar{v} \cdot \bar{n} \, da = <\bar{v} \cdot \bar{n}> A_{PROJ} \quad (11)$$

where $A_{PROJ}$ is the projected area of the vessel lumen onto the sample plane S, and $<\bar{v} \cdot \bar{n}>$ is the area-average fluid velocity normal to the plane. Stated in this form it is apparent that precise knowledge of the lumen size, shape, and orientation is not necessary for an accurate measurement of $\dot{Q}$. Instead, it is sufficient to know the area of the lumen projection $A_{PROJ}$ onto an arbitrary sample volume plane. Likewise, precise determination of the two-dimensional velocity field across the lumen is not necessary. Rather, only the area-average velocity component $<\bar{v} \cdot \bar{n}>$ normal to the sample plane need be measured.

Figure 1:
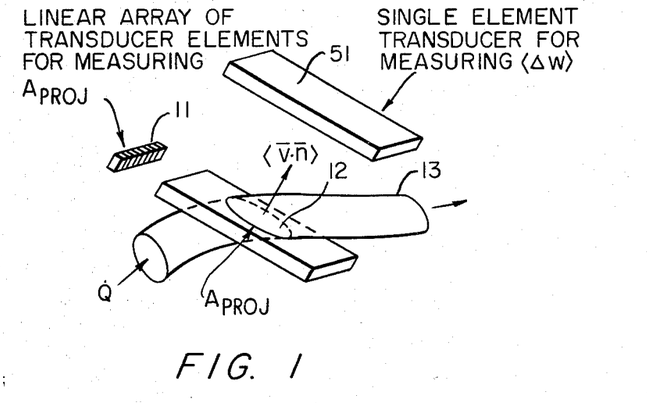
FIG. 1 is a schematic diagram showing a linear array of transducer elements for measuring projected area and a single element transducer for measuring the backscattered power spectrum.
Figure 2:
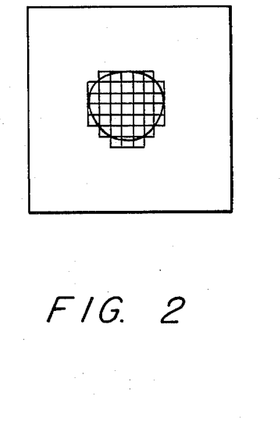
FIG. 2 shows the area image provided by the transducer array and associated system.
Figure 3:
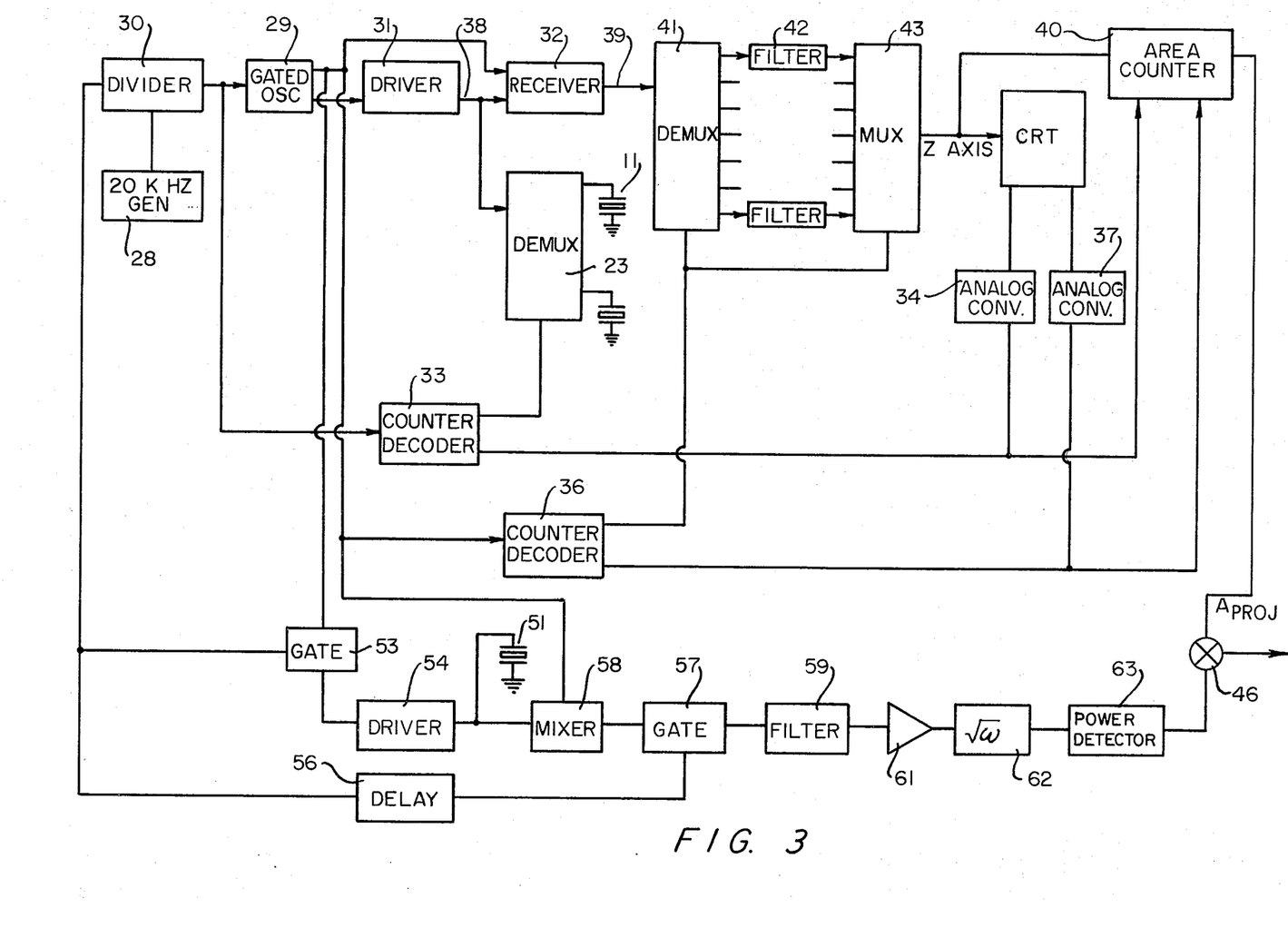
FIG. 3 is a schematic circuit block diagram of the circuits employed with the transducers of FIG. 1 to provide a measurement of the volume flow.

FIGS. 1 through 3 show one implementation relying on Doppler imaging to measure the lumen projected area, $A_{PROJ}$. In this case, a linear array of transducer elements 11 is used to generate a Doppler B scan, FIG. 2, of the thin sample volume lying in a sample plane indicated by the dotted area 12 in conduit 13. A system employing a linear array of transducer elements to provide an image of the cross-section of a vessel is described Pat. No. 3,888,238.

Referring more particularly to FIG. 3, a block diagram of the system associated with the linear array to provide a display of the projected area is shown. As will be apparent from the description of the invention to follow, it is not essential that a display of the projected area be provided in order to determine flow volume. However, it is desirable to do so. A typical display can, for example, be an oscilloscope with a cathode ray tube in which the beam is deflected in the X direction in synchronism with scanning of each element for reflection from various depths and in the Y direction as one shifts from one element to the next adjacent element. The electron beam is intensity modulated by unblanking in accordance with the signals received. That is, if a reflected signal is received by a transducer for a particular depth indicating motion of blood cells, the beam is turned on thereby providing an illuminated spot on the cathode ray tube display such as shown in FIG. 2.

The transducer elements 11 are shown connected to a transducer demultiplexer 23. Each of the transducer elements 11 acts as a near field source and receiver in a Doppler system. For purposes of description, it is assumed that the transducer array includes eight transducer elements 11. It is understood that more elements can be used to provide improved lateral resolution. In operation, the transducer elements are sequentially energized with a burst of energy having a predetermined frequency. By way of example, the burst may be one microsecond bursts at 6 MHz frequency. Ultrasound energy reflected from the moving blood cells is received by the transducer elements and processed to detect Doppler frequency shift. This indicates moving blood cells at various depths. In one example, each element transmits in sequence one microsecond bursts at 50 microsecond intervals for a period of 10 milliseconds, or 200 bursts, before sequencing to the next transducer element which emits another 200 bursts. This permits detection of Doppler shift down to 100 Hz. After each transducer has, in turn, been fired, the entire sequence repeats commencing with the first transducer. During the 50 microsecond interval between bursts, the associated beam of the cathode ray tube of an associated display apparatus scans across the face of the tube to form repetitive traces at one vertical position. When the system steps to the next transducer, the trace moves one increment in the vertical direction to provide another set of traces.

The system includes timing means, in this example a 20 KHz generator 28, which provides timing for the system. The generator is connected to a divider 30 with one output to a gated 6 MHz oscillator 29 to gate the oscillator at a 10 KHz rate. The oscillator 29 also provides a continuous output to the Doppler receiver 32. Bursts are amplified by driver 31 and applied to the demultiplexer 23 and directed to the transducer elements 11. The output from the divider is also applied to a counter-decoder 33 which serves to count the output from the generator 28 and provides control signals to the transducer demultiplexer 23. For example, the counter-decoder may be a ring counter which provides control signals to the transducer demultiplexer so that after 200 pulses have been applied to one transducer element 11, the bursts from driver 31 are applied to the next transducer element 11. The counter serves to sequentially shift through the elements 11 until they are all scanned and then returns to the first element where the cycle repeats. The counter-decoder also provides an output to a digital to analog converter 34 which is associated with the Y deflection circuits of the oscilloscope whereby the beam is deflected in the Y direction to provide the next display line corresponding to the next transducer element.

The continuous output from the 6 MHz oscillator may be employed to drive a decoder-counter 36 which serves to count and decode the input signal and provide an output to a digital to analog converter 37 which controls the X axis deflection circuits of the oscilloscope, that is, each time a transducer element is energized, the X axis beam scan begins in synchronism therewith. It will be apparent that certain oscilloscopes are provided with internal X axis deflection sweep controls and that the internal control may be adjusted to scan at the proper rate in synchronism with energizing of the transducer elements.

As the transducers are energized from the driver 31 with a burst of energy which ensonifies the blood, the energy is reflected by flowing particles. The reflected energy strikes the sending transducer to generate an electrical signal which is directed along the line 38 to a Doppler receiver 32. The Doppler receiver is of a conventional type wherein the 6 MHz signal from the oscillator 29 is multiplied with the reflected energy to provide a video output on the line 39 connected to the demultiplexer 41. In order to detect reflection from moving particles at various depths, the reflected energy may be sampled. The counter-decoder connected to the oscillator 29 provides output control pulses to control the demultiplexer 41 and the audio filter multiplexer 43. Preferably, the pulses are 1.3 microseconds wide. These pulses control the audio filters 42 to receive video signals for the 1.3 microsecond interval. These pulses also control the audio filter multiplexer 43 so that the output of each filter is sequentially sampled to modulate the beam intensity of Z axis of the cathode ray tube. The time lapse between the transmitted burst and the particular sampling window pulse determines the depth from which the reflected energy is being sampled. The first transducer element remains connected to the driver receiver for 20 milliseconds during which time the routine of burst generation by the transducer and video sampling by each filter is repeated 200 times to make 200 depth readings.

The signals from the counter-decoders 33 and 36 are also applied to an area counter 40. The area counter also receives the Z-axis signal from the multiplexer 43. The output of the X-axis decoder is employed to control a gate which opens to pass the Z-axis signal to a counter. The y-axis signals are employed along with the X-axis signals to control the total count cycle so that it signals a complete scan period. The counter serves to provide a count which is representative of the number of times the beam is unblanked and this signal compared to the total count from the X and Y-axis input provides an output signal which is representative of the area of the unblanked portions of the display. This signal is applied to a multiplier 46 and is the signal proportional to $A_{PROJ}$. The signal is updated as the scanning array performs the B-scan.

In accordance with one embodiment of the invention, this signal is multiplied by a signal which corresponds to the area average fluid velocity normal to the surface. This signal, as previously explained, is proportional to the Doppler power spectrum centroid. The second signal applied to the multiplier 46 is derived from the single element transducer 51, FIG. 1. This element is alternately pulsed with the transducer 11. This is done by providing the other output of the divider 30 to drive a gate 53 to provide a 6 MHz pulse to the driver 54 which drives the crystal 51. A suitable delay circuit 56, such as a one shot oscillator, or counter delays the gating pulse for a predetermined time and then applies it to a gate 57 which serves to connect the output of the mixer 58 to the filter 59. The inputs to the mixer are the output of oscillator 29 and of the transducer 51. The mixer mixes the signals and provides a video output to gate 57. The output of the filter 59 is applied to amplifier 61 which normalizes the signal applied to the discriminator 62. The signal is normalized to provide constant power to the discriminator 62. The output of the discriminator is applied to power detector 63, which detects the power and provides an output $<\Delta\omega>$ which is proportional to the Doppler power spectrum centroid. As explained above, this is representative of the velocity of the particles. This signal is scaled by applying it to multiplier 46 which multiplies the signal $<\Delta\omega>$ by the signal $A_{PROJ}$ to provide an output signal proportional to the volume flow.

Figure 4:
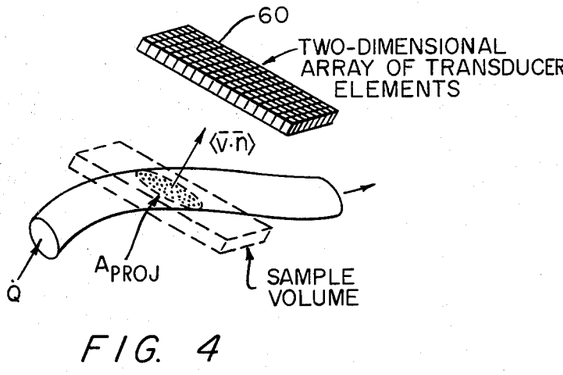
FIG. 4 shows a two-dimensional transducer array which provides both Doppler imaging and the power spectrum.
Figure 5:
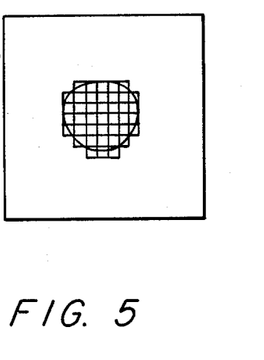
FIG. 5 shows the area image provided by the transducer array and associated system.
Figure 6:
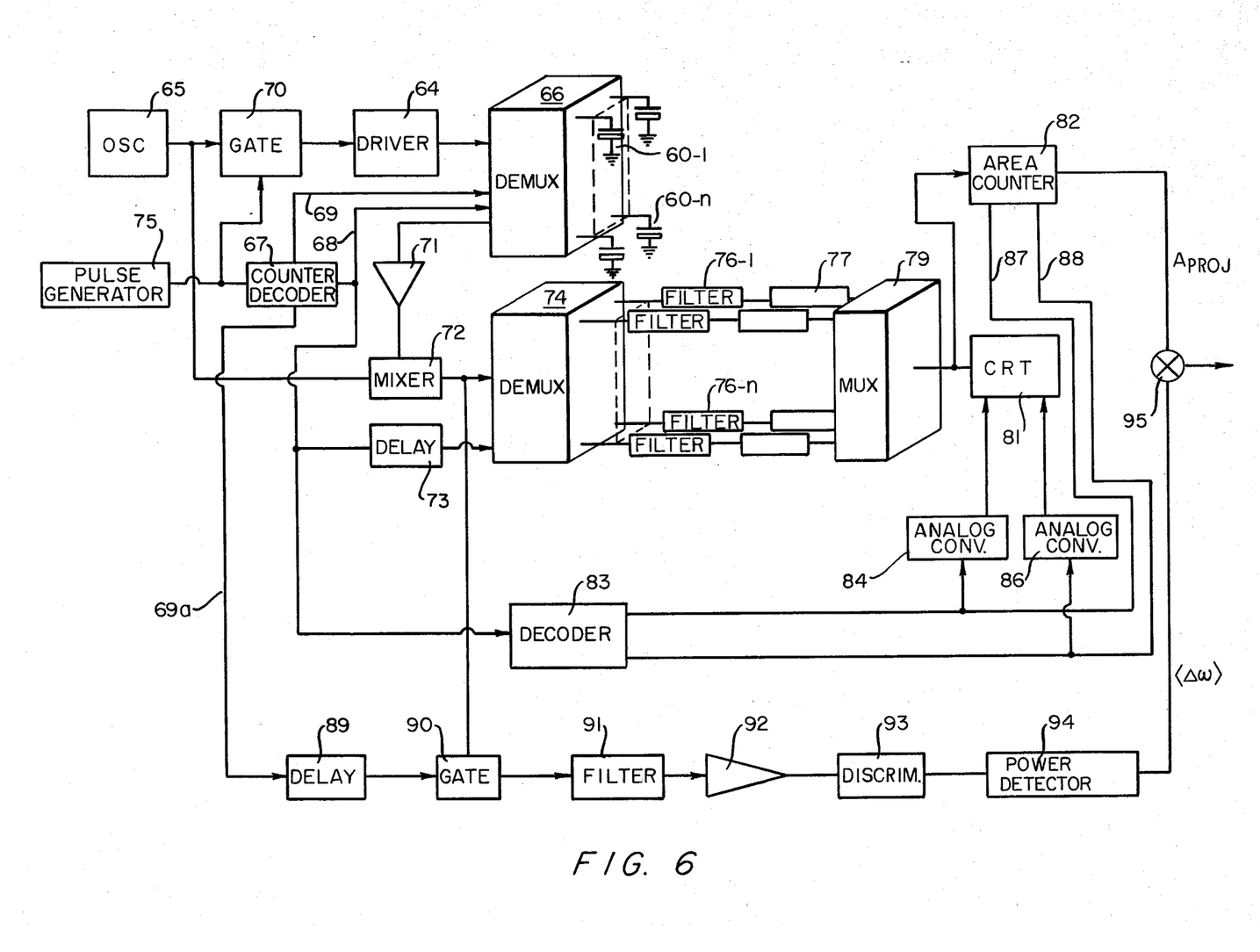
FIG. 6 is a schematic circuit block diagram of the circuits used with the transducer of FIG. 4 to provide a measurement of volume flow.

The second embodiment of the invention is shown in FIGS. 4, 5 and 6. A single two-dimensional array of transducers 60 are employed to provide a C-scan, FIG. 5, and are simultaneously employed to ensonify the sample volume and detect the backscattered power. FIG. 6 shows a block diagram of a system which can be employed in connection with the transducer shown in FIG. 4 to provide a measure of volume flow. An oscillator 65 which may be a 6 MHz oscillator has its output applied to gate 70. The system control in the form of a pulse generator 75 provides output pulses as, for example, at a 20 KHz rate and serves to open the gate 70 to provide output pulses of, for example, 1 microsecond duration at 50 microsecond intervals. The output of the gate is applied to a driver 64 which provides its output to demultiplexer 66. The output of the pulse generator is also applied to a counter-decoder 67 which provides a first output along the line 68 which serves in connection with the demultiplexer to sequentially switch the individual transducers 60-1 through 60-n so they sequentially generate pulses of ultrasonic energy. For example, each of the transducers 60 is associated with a switch which is switched by the signal on the line 68 whereby each transducer in a row is switched sequentially as described above and then the next row, etc., until the final row shown through 60-n, at which time the switching reverts to the first transducer 60-1 and the cycle is repeated. The counter-decoder also provides output signals on the line 69 which serves to turn on all the switches at one time whereby the pulse from the driver energizes all transducers at one time to provide an output beam of the type which is derived by the single transducer in the embodiment referred to above. This signal is employed to derive the Doppler power spectrum centroid.

The received outputs from the individual transducers are amplified by amplifier 71 and applied to a mixer 72 which received the output from the oscillator 65 to provide a video output to a demultiplexer 74. The output of the counter 67 is applied to an adjustable delay circuit 73 which provides a delay corresponding to the depth of the volume plane to be scanned for the C-scan. The demultiplexer then serves to receive the mixed signals and apply them in rows and columns as before to the plurality of filters 76-1 through 76-n whose outputs are applied to power detectors 77 and thence to a multiplexer 79 whose output is then applied to control the Z-axis of the cathode ray tube 81 to form the C-scan display. The output is also applied to an area counter 82 of the type previously described. The output from the counter-decoder 67 is also applied to a decoder 83 and thence to digital to analog converters 84 and 86 which control the X and Y-axis deflection circuits of the oscilloscope. The output of the decoder 83 is also applied along the lines 87 and 88 to the area counter 82 which, as before, provides an output, $A_{PROJ}$, which is representative of the projected area of the sample volume plane. The area counter includes storage circuits which store the output signal for a predetermined time whereby a plurality of power spectrum centroid measurements can be made between area scans.

When an output is applied along the line 69 to energize all the transducers at one time, an output is also applied along the line 69a and thence to a delay circuit 89 which controls gate 90 which then gates the signal from the mixer 72 to a band pass filter 91. The signal is the combined signal from all the transducers since they have been simultaneously switched on. The input of filter 91 is applied to normalizing amplifier 92 and thence to discriminator 93. Power detector 94 obtains the output $<\Delta\omega>$. Multiplier 95 multiplies the output $<\Delta\omega>$ by the scaling factor $A_{PROJ}$ to provide the volume flow $\dot{Q}$. The counter-decoder 67 provides a plurality of sequential signals along the lines 68, 69, between area scan signals on the line 69a.

Figure 7:
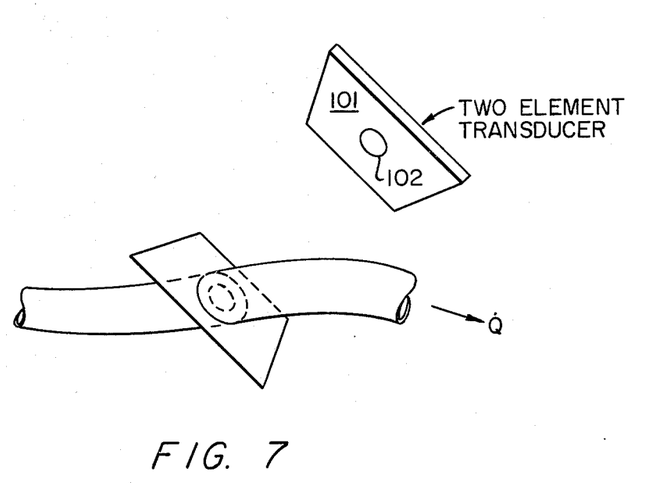
FIG. 7 shows a two-element transducer used in connection with a conduit.
Figure 8:
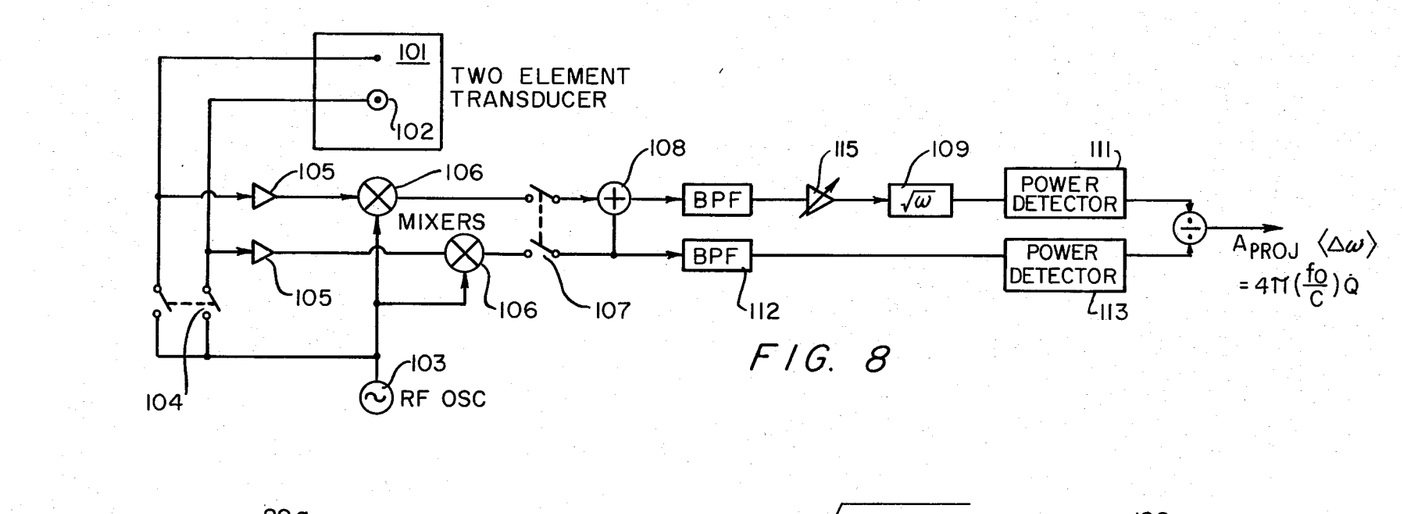
FIG. 8 is a schematic circuit block diagram of the circuits employed with the transducer elements of FIG. 7 to provide a measurement of volume flow.

The third embodiment of the invention which is illustrated in FIGS. 7 and 8 does not derive a scaling signal which corresponds to the lumen projected area but rather a scaling signal which is proportional to transmission (attenuation) and scattering and scales a signal which is proportional to the first moment of the Doppler power spectrum signal to provide the measurement of flow volume. Referring to the figures, there is shown a two-element transducer including an element 101 and in a smaller central zone an element 102. The element 102 is designed to locate a sample volume totally within the vessel lumen. Backscattered Doppler power detected by the smaller transducer is proportional to the unit volume scattering cross-section of the blood. However, like the signal returning to the larger element, it suffers from attenuation due to absorption and scattering. If the sample plane is uniformly ensonified, attenuation and scattering losses with respect to all points on the sample plane can be considered uniform. FIG. 8 shows a block diagram of a system used in conjunction with the transducers 101 and 102. Both transducer elements are driven with the same sinusoidal burst from rf oscillator 103 via switches 104. The returning backscattered signals after amplification 105 are mixed separately with the oscillator signal at mixers 106. Video signals are range gated simultaneously after a delay corresponding to the range of interest by the gates or switches 107. When the two signals are summed by adder 108 as shown in the upper signal path, uniform illumination of the sample plane can be approximated. This composite audio signal, with power spectrum $S^{1+2}(f)$ is passed through discriminator 109. The resulting signal power is then detected 111 to achieve an unnormalized average velocity. The gain in this channel is adjusted by amplifier 115 to compensate for the difference in antenna gains of the two transducer elements. The signal from transducer 102 is applied to band pass filter 112 whose output is applied to power detector 113 to form a scaling signal. The unnormalized average velocity estimate is scaled by dividing by scaling signals derived by the smaller transducer element. This operation is expressed by the following expression:

$$\frac{4\pi (f_o)}{c} \dot{Q} = \frac{\int |G_2(\vec{r})|^2 dr}{|G_{1+2}(0)|^2} \cdot \frac{\int f S_{1+2}(f) df}{\int S_2(f) df} \quad (12)$$

While $f_o$ is the transmitted ultrasonic frequency, $\int @G_2(r)|^2 dr$ is the antenna beam factor of element 102 integrated over its entire sample volume, $|G_{1+2}(o)|^2$ is the beam factor per cm.$^2$ of sample area when elements 101 and 102 are summed, the integral $\int S_2(f)df$ indicates the Doppler power received by the element 102 from within the lumen, and $\int f S_{1+2}(f)df$ is the first moment of the Doppler power spectrum.

Although the description of the three embodiments has been directed to systems including transducers which operate as near field sources and receivers, it is apparent that far field transducer systems using lenses or electronic beam steering can be employed to ensonify the sample volume and to receive backscattered power.

The systems thus far described give a measure of the total volume flow at the surface but do not provide information regarding the direction of flow or the net flow. It will be apparent to one skilled in the art how the systems can be modified to give direction of flow as well as net flow.

Figure 9:
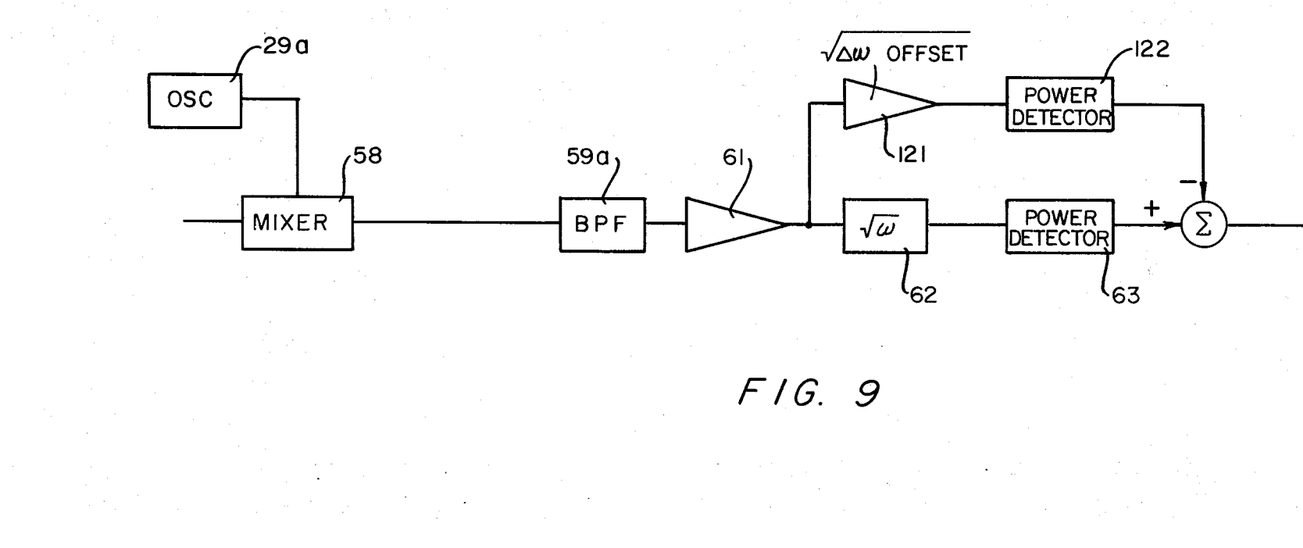
FIG. 9 is a schematic block diagram of a modification to the systems described which provides direction of flow and net flow.

An example of such a system is shown in FIG. 9 wherein the centroid detector portion of FIG. 3 has been modified. An oscillator 29a provides the local oscillator signal to the mixer 58 rather than the oscillator 29. The oscillator 29a operates at a frequency which is offset from that of the oscillator 29 by a predetermined amount, $\delta f_{offset}$, for example 4 KHz. The filter 59a is a notched filter having a notch at $\delta f_{offset}$. The amplifier 61, discriminator 62 and the power detector 63 are the same.

In this embodiment, an additional branch is provided to generate a correction term to allow determination of mean motion. The amplifier 121 amplifies the signal from the filter by an amount equal to $\sqrt{\delta\omega_{offset}}$ ($\sqrt{2\pi\,\delta f_{offset}}$). This signal is processed by the power detector 122 which generates a correction signal which is subtracted from the output of the power detector 63. The effect of this is to provide $<\delta\omega>$ which indicates the true net flow and direction at the sample surface. A similar arrangement can be employed with the circuits deriving signals proportional to the Doppler power spectrum centroid in FIG. 6 and first moment in FIG. 8.

Thus, there has been provided a pulsed Doppler system and method for unambiguously measuring volume flow independent of the vessel orientation, shape or fluid velocity profile. The system derives a signal which is proportional to the Doppler power spectrum and scales the signal to provide the volume flow.

What is claimed is:

1. A system for measurement of fluid volume flow in a conduit including ultrasonic transmitting transducer means, means for driving said transducer means to ensonify a thin sample volume surface in the conduit in which fluid volume flow is to be measured, receiving transducer means positioned to receive backscattered power from particles in said sample volume surface and form a backscatter signal, means for processing the backscatter signal of the receiving transducer means to obtain a first signal which is proportional to the first moment of the Doppler power spectrum, means including transducer means for obtaining a second signal from said sample volume surface, means for processing said first and second signals to scale the first signal by a scale factor which is proportional to the Doppler power received from a unit area of the sample volume surface within the conduit to provide an output signal which is proportional to the volume flow in said conduit.

2. A system as in claim 1 in which said transducer means for obtaining a second signal from the sample volume surface includes a plurality of transducers forming ultrasonic B-scan signals of said sample volume surface and means for receiving said signals and providing a second signal proportional to the projected area of said sample volume surface.

3. A system as in claim 1 in which said transducer means for obtaining a second signal from the sample volume surface includes a plurality of transducers forming ultrasonic C-scan signals of said sample volume surface and means for receiving said signals and providing a second signal proportional to the projected area of said sample surface.

4. A system as in claim 3 wherein said plurality of transducers are operated simultaneously to form said ultrasonic transducer transmitting and receiving means forming the backscatter signal which is processed to obtain the first signal.

5. A system as in claim 1 in which said transducer means for obtaining a second signal from the sample volume surface includes transducer means which transmits and detects backscattered power from a sample volume surface totally within the conduit.

6. A system as in claim 1 including means connected to said means for processing the output signal of the receiving transducer for generating a correction signal, and means for subtracting said correction signal from the first signal which is proportional to the first moment of the Doppler power spectrum whereby the output signal includes direction of flow and net flow at said sample surface.

7. A system for measurement of fluid volume flow in a conduit comprising a multi-element transducer, means for applying ultrasonic energy to said multi-element transducer to ensonify a sample volume surface in the conduit, means for processing the output of the elements of said transducer generated by backscattered ultrasonic energy from said sample volume surface to generate a first signal, means for processing the output of selected elements to derive a second signal, means for processing said first and second signals to generate at least one scaling signal which is proportional to the backscattered ultrasonic energy received from a unit area of the sample volume surface, and means for scaling said first signal by said scaling signal to generate an output signal which is proportional to volume flow.

8. The method of measuring volume flow in a conduit which comprises the steps of ensonifying a sample volume surface in the conduit, receiving the backscattered power from said sample volume surface and generating a signal, processing said signal to obtain a first signal which is proportional to the first moment of the Doppler power spectrum, additionally generating a second signal from energy received from said sample surface, processing said first and second signals to scale the first signal by a scale factor which is proportional to the Doppler power received from a unit area of the sample surface within the conduit to provide an output signal which is proportional to the volume flow.

9. The method as in claim 8 in which said first signal is proportional to the centroid of the Doppler power spectrum.

10. The method as in claim 9 in which the second signal is proportional to the area of said sample volume surface.

11. The method as in claim 10 in which said second signal is generated from a B-scan of the sample volume surface.

12. The method as in claim 10 in which the second signal is generated from a C-scan of the sample volume surface.

13. The method as in claim 8 in which the second signal is proportional to transmission and scattering.

14. The method of claim 8 including the additional steps of processing said signal to generate a correction signal and subtracting said correction signal from said first signal whereby said output signal indicates direction and magnitude of net flow at said sample surface.

* * * * *

UNITED STATES PATENT AND TRADEMARK OFFICE
CERTIFICATE OF CORRECTION

PATENT NO. : 4,067,236

DATED : January 10, 1978

INVENTOR(S) : CHARLES F. HOTTINGER

It is certified that error appears in the above-indentified patent and that said Letters Patent is hereby corrected as shown below:

Column 1, line 3, insert the following paragraph:

--This invention was made with Government support under contract No. GM17940 awarded by the Public Health Services. The Government has certain rights in this invention.--

Signed and Sealed this

Twenty-fifth Day of April, 1995

Attest:

BRUCE LEHMAN

Attesting Officer     Commissioner of Patents and Trademarks